March 20, 1962 E. J. KRAWETZKE ETAL 3,025,638
HANDLING OF HOT GLASS
Filed Feb. 25, 1959
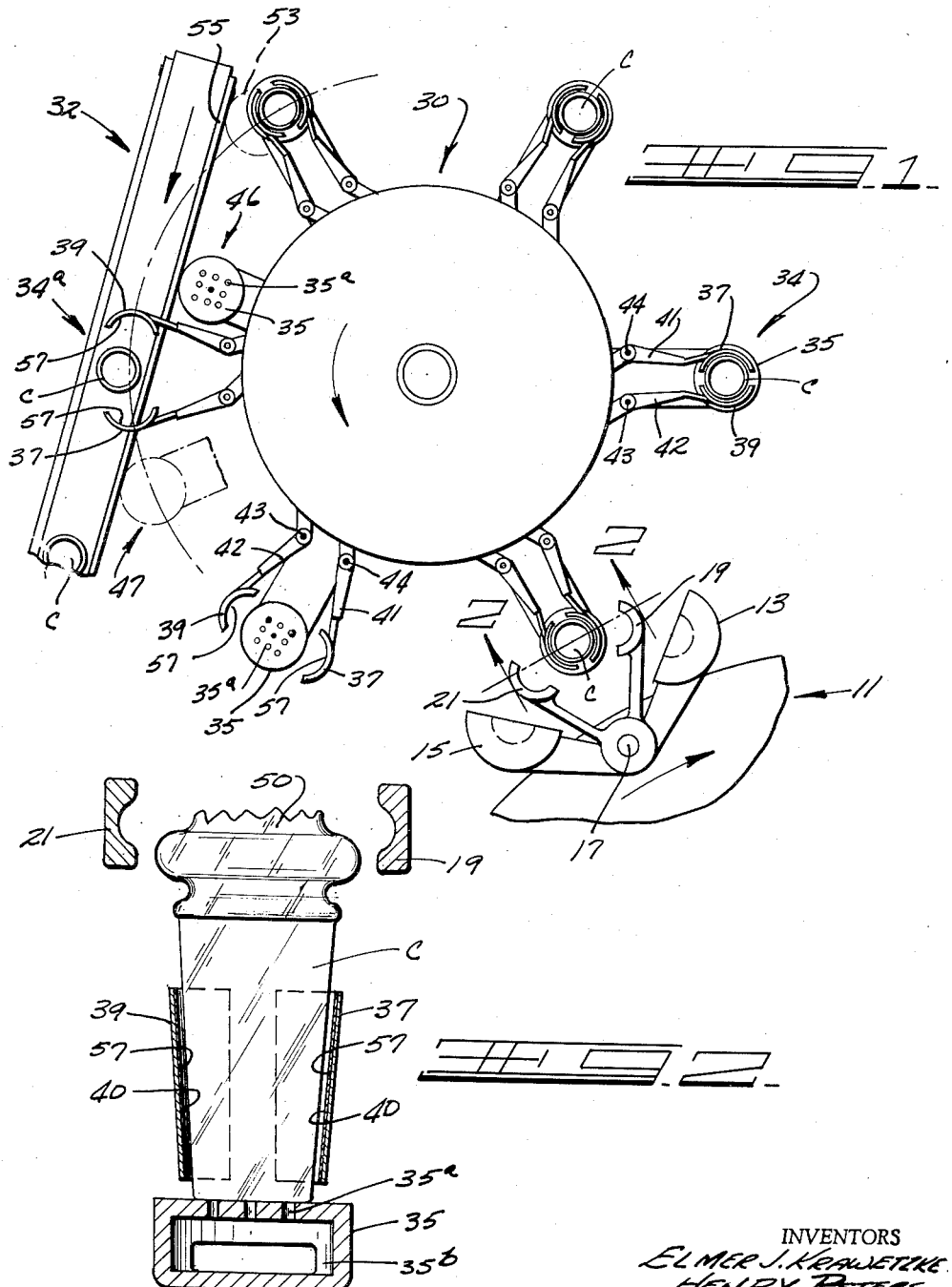
INVENTORS
ELMER J. KRAWETZKE
HENRY PETERS
BY United States Patent Office 3,025,638
Patented Mar. 20, 1962

3,025,638
HANDLING OF HOT GLASS
Elmer J. Krawetzke and Henry Peters, Toledo, Ohio, assignors to Owens-Illinois Glass Company, a corporation of Ohio
Filed Feb. 25, 1959, Ser. No. 795,522
12 Claims. (Cl. 49—14)

The present invention relates to the handling of glass, and, more particularly, the handling of glass containers while they are at elevated temperatures.

The handling of glassware in the plant wherein produced presents a difficult problem due to the inherent fragility of the material. Over and above this general problem is the additional factor of handling the glass in the various intermediate stages of its production. A specific example is the handling of the glass as it leaves the forming operation. At this stage, the glass is at a temperature in the neighborhood of 900° F. to 1500° F., depending upon the thickness of the glass section involved in the particular glass container and the time interval elapsed after the forming thereof. It is necessary to handle the glass containers at this stage in order to transfer them to another operational stage of the manufacturing process. The transfer operation is usually mechanized, with the result that the containers are contacted by tongs, cups, support members, slides, etc. The temperature and other factors involved in the mechanization concept necessitate the use of metal as the material of construction for these contact members.

Unfortunately, it is found that contact between the metal members and the glass container which is at the elevated temperature indicated hereinabove, frequently causes "check marks" in the glass containers. A "check mark" is a visible "line" or "fracture" in the wall of the ware, e.g., a glass container, and ware possessing such a defect must be scrapped because the "check mark" represents a point or zone of weakness which may later cause the container to fail.

Various approaches have been taken in an attempt to insulate the surface of the ware from the ware-handling arms, tongs, cups, etc., in order to eliminate "check marks." Thus, pads fabricated of asbestos, and the like have been tried. It is found, however, that either these pads fail at the temperature involved, or become frayed and quickly worn out due to the abrasion encountered in the high speed operation of the mechanized equipment.

A variety of coatings for the metal glass-contacting members have likewise been tried, but these have generally demonstrated lack of durability, necessitating continued, repeated recoating of the members. This, of course, involves a large inventory of the metal parts for replacement, or too frequent shut-down of the mechanized equipment for either replacement or recoating of the metal components concerned. In addition, it has been found that the coatings are actually unsatisfactory with respect to the elimination of "check marks."

The exact phenomena involved in the imparting of "check marks" by contact between air-contacting metal surfaces and hot glass is not perfectly understood; however, it is believed that the "check mark" is caused by too rapid a chilling of a localized portion of the wall, and that this thermal shock causes the "fracture line" or "check mark."

The failure of known coatings is believed to be caused by several factors. Thus, the coatings known in the art are usually natural or synthetic varnish-like materials which are subject to degradation at high temperature. Another obvious factor, of course, is the abrasion and friction which occur between the glassware and the coated metal member.

Having in mind the foregoing, it becomes a principal object of the present invention to provide an improved coating for metal surfaces adapted to come into contact with glass articles while at elevated temperatures.

It is likewise an object of the present invention to provide an insulated glass-contacting member which does not impart "check marks" to glass articles contacted thereby.

It is still another object of the present invention to provide a scheme for coating glass-contacting members which is extremely long-lived, and, consequently, does not require frequent shut-down of equipment for replacement.

The foregoing and other objects of the present invention will become apparent to those skilled in the art from the following detailed description, taken in conjunction with the attached sheet of drawings, on which there is presented for purposes of illustration only, one embodiment of the practice of the invention.

In the drawings:

FIG. 1 is a plan view which is partially schematic and shows a glass container transfer apparatus for receiving glassware from a press and blow machine and delivering same to a linear conveyor for transporting the ware to a "burn-off" machine.

FIG. 2 is a sectional view taken on the line 2—2 of FIG. 1.

Basically, the present invention involves an improved coating for hot glass handling members, said coating being composed of a solvent solution of a thermosetting resin containing a filler system including graphite as a lubricating ingredient, and finely divided talc as an insulating and permanence-imparting ingredient.

Referring now more specifically to the drawings, there is shown in FIG. 1 in schematic form, a rotary, multiple head press and blow glass-forming machine 11 having a pair of glassware mold halves 13 and 15 adapted to pivot about a pin 17, and a pair of neck ring half molds 19 and 21, likewise pivotable about pin 17. The neck rings 19 and 21 are located above the mold halves, and both the neck rings and the mold halves 13 and 15 represent one forming head rotating in the direction indicated by the arrow. A plurality of such stations are contained in the schematically illustrated, rotary-type press and blow glass-forming machine. A transfer mechanism 30 is adapted to transfer the molded glassware from the forming machine to a linear, horizontally disposed conveyor 32, which, in turn, conveys the glassware to a "burn-off" machine (not shown). The transfer or take-out apparatus 30 is of rotary, multi-head construction. Each head or station 34 is composed of a circular platform member 35 and, mounted thereabove, a pair of cup halves 37 and 39. The circular support plate and the cup half members define, in effect, a cavity or chamber for receiving a glass container. The mold halves are mounted on arms 41, 42, respectively, and pivotably hinged as at 43, 44. The arms are controlled by cams in a known manner so that as the heads rotate, the cup halves move from a closed position, as shown at 34, to an open position, as shown at 34a. The support plate 35, of course, remains directly below the cup halves, except as the transfer apparatus comes into registry with the linear conveyor 32. At this point, the circular support plate is adapted for movement inwardly, as shown schematically by reference numeral 46. As rotation is continued, however, the support plate passes out of contact with the linear conveyor, and then moves outwardly, as shown by reference numeral 47.

Both the glass-forming machine 11 and the transfer apparatus 30 operate continuously and in such fashion that the take-off stations 34 are synchronized with the mold-forming stations so that both reach a common point of registry at the same time, and as particularly illustrated in FIG. 1.

Thus, as the glass-forming machine approaches registration with the take-out station, the mold halves open, while the neck ring halves thereabove remain in gripping engagement with the "moile" portion 50 of the glass container C. The cup halves, at the same time, are open, but are so cam-controlled, as are the neck ring halves, that, when registration is achieved, the glass container hanging down from the neck ring halves meshes between the cup halves, whereupon the neck rings open, as shown in FIG. 2, and drop the glass container a short distance down onto the circular support plate 35, while the cup halves close simultaneously. All of the foregoing operate automatically and continuously. The glass container resting on the support plate 35 and loosely held there by the cup halves 57, 39, is rotated counter-clockwise into proximity with the linear conveyor 32. As it reaches the position shown in dotted form and identified by reference numeral 53, the cup halves commence to open, while the circular support plate, urged by the contact with the side rail 55 of the conveyor, moves inwardly, although remaining in contact with the side rail, whereupon the glass container is pushed outwardly by the cup half 39 into the central portion of the conveyor 32. The cup halves remain open so that the container C is passed down the length of the conveyor and out of the confines of the cup halves. The cup halves remain open until registration with the forming machine station occurs and a container is placed on the support plate, at which time the cup halves close.

It will be appreciated that the glass containers, as they are handled by the transfer apparatus 30, are just below forming temperature. In other words, the temperature, in the course of the travel counter-clockwise from the receiving station proximal to the neck rings to the delivery station at the conveyor, will range in general from about 900° F. to about 1600° F. In accordance with the present invention, the inner surfaces 57 of the cup halves are coated with a coating composition, as described hereinafter, to prevent contact between the bare metal of which the cup halves are formed, and the side walls of the glass container C. To provide some cooling of the coating, the circular support plates 35 are provided with a plurality of apertures 35a which communicate with a hollow core 35b, which is supplied with coolant air by any suitable means. The apertures 35a direct the coolant air upwardly into the space surrounded by the cup halves 37 and 39. In addition, the cooling air serves to cool the bottoms of the glass containers, which are of thicker section than the side walls.

We have determined that a coating for the cup halves should possess the following properties: It should be generally inert at the elevated temperatures involved so that it will not mark the hot glass surface. In addition, the coating should be insulating in character so that heat is not rapidly transferred from the hot glass surface, which would chill the glass surface and result in thermal shock. The coating should also be hard and abrasion-resistant so that it will not wear off due to the frictional contact between the coated cup half and the glass surface in the operation of the equipment as described hereinabove. In addition, the coating should have a lubricating quality so that marking or scoring of the hot glass surface is avoided. Lastly, the coating must be resistant to oil and water, which are, in one way or another, usually present in the vicinity of the operation.

Some of the prior art coatings which have been employed in applications of this type have been composed of an oil or an oil-base dope. These have not been desirable, because they do not satisfy the requirements outlined above, and, in addition, have a tendency to form a carbonaceous deposit on the glass container. More important, these coatings wear off within an hour of continued use in the application as described above.

Another coating which has been employed is composed of a mixture of a thermosetting resin and graphite. The thermosetting resin is desirable because it is irreversibly curable to the solid state when baked on the metal surfaces, and does not soften again at elevated temperatures, as in the case of a thermoplastic resin. Generally, the phenolic resins (a resinous condensation production of phenol and formaldehyde) has been found to be highly desirable, having in mind the additional factor of abrasion-resistance and hardness. One phenolic resin which is representative is obtainable from the Union Carbide Corporation under the code number designation BV-1600.

The phenolic resin-graphite coating is usually desirably mixed intimately with a liquid thinner and applied to metal surfaces by painting, spraying, or dipping. Organic type solvents, e.g., xylene, toluene, etc., are conveniently suitable as liquid vehicles because the resin is soluble therein, and also because the boiling point is conducive to a baking application of the mixture. It will be appreciated that the amount of solvent with respect to a given amount of resin and graphite will determine the viscosity of the mixture, and may be adjusted in accordance with the type of application to be employed. The proportion of resin and graphite to solvent is usually expressed as percent solids, e.g., $$\frac{\text{Combined weight of resin and graphite}}{\text{Combined weight of resin, graphite and solvent}} \times 100$$
$$= \text{percent solids}$$

The weight figures are obtained simply by determining the weight of the total mixture before and after confinement in a mild warm air furnace which serves to drive off the solvent.

The combination of a thermosetting resin and graphite or molybdenum disulfide as lubricating fillers is taught in U.S. Patent 2,758,421 in connection with providing a coating of low drag for a chute for conveying glass.

A xylene solvent solution of phenolic resin containing graphite as a filler, and a minor amount of manganese napthanate drier is marketed by the Buckeye Paint and Varnish Company of Toledo, Ohio, under the name "Buckeye Glass Chute Coating." This coating material is composed of about 65% solids (resin and graphite) and 35% xylene, as determined by first weighing a sample, then placing the sample in an oven maintained at 160° F. for one hour, followed by a re-weighing to determine the weight loss of the solvent. The coating has a specific gravity at 76° F. of 1.124, and its viscosity measures 1277 Saybolt Universal Seconds at 100° F., and 154.9 Saybolt Universal Seconds at 210° F. Its viscosity index is 130. The solids content of the coating is composed of about 70% phenolic resin and 30% graphite.

EXAMPLE I

Several coats of the resin-graphite xylene coating, described in the preceding paragraph and referred to as "Buckeye Glass Chute Coating," were applied to a series of cup halves (reference numerals 37, 39 in the drawings). The coatings were applied with a brush and individually baked to cure the resin and bond the coatings to the metal surface. The double coated cup halves were then installed in the apparatus described hereinabove, and operation was commenced. It was observed that of the glassware handled by the coated cup halves, a high proportion had "check marks" which necessitated scrapping such ware. As the operation continued, the prevalence of ware containing "check marks" increased. After an hour of operation the "check marks" were so prevalent that replacement cup halves had to be substituted. Examination of the cup halves removed revealed that practically all the cup halves possessed areas which were no longer coated, exposing bare metal. It was further obvious that the coating on all cups was markedly deteriorated.

The use of cup halves bearing three coats instead of two did not achieve noticeable improvement.

EXAMPLE II

To one-half pint (265 gms.) of the Buckeye Glass Chute Coating, was added about six ounces (170 gms.) of finely divided asbestos to form a thick slurry. Asbestos is found in nature as a fibrous silicate mineral having the formula $3MgO-2SiO_2-2H_2O$. The resultant liquid slurry was mixed thoroughly and painted onto the inner surface of a series of cup halves. The coating spread evenly and uniformly. The coated cup halves were then baked in a hot air oven to cure the resin and bond it to the metal surface. A second coat of the asbestos-filled mixture was then applied and baked to provide a double coating, which was firmly adhered to the metal surfaces. The coated cup halves were then installed in the apparatus as described hereinabove, and operation commenced. The glassware handled by the coated cup halves was found to contain a proportion of "check marks," which proportion increased as time passed. At the end of one hour's continuous operation the "check marks" were so prevalent that the cup halves had to be replaced. Examination of the coated cup halves which were removed revealed that the cup halves no longer had a continuous coating, and, in fact, an appreciable amount of the coating had disappeared. As in Example I, three coats failed to effect noticeable improvement.

EXAMPLE III

The preceding example was repeated, except that insulating material manufactured by the assignee of the present application under the trade-mark "Kaylo" was substituted for the asbestos. The insulating material was first, of course, converted into finely divided form to insure a uniform mixture. The insulating materials sold under the trade-mark "Kaylo" are hot-air dried products of the pressure induration of a slurry of calcium oxide, silicon dioxide, and water, which contain, in the finally dried form, some combined water. They have a general formula $XCaO-YSiO_2-ZH_2O$, wherein X, Y, and Z are integers, the numerical value of which is dependent upon the ratio of the materials as charged, and the temperature pressure and time of reaction. The "Kaylo" materials are essentially micro-porous, crystalline structures of Lepisil and Xonotlite, and are disclosed more fully in U.S. Patents 2,547,127 and 2,665,996.

The amount of ground insulating material ("Kaylo") utilized in combination with the 265 gms. of xylene-phenolic resin-graphite mixture (Buckeye Glass Chute Coating) was varied, but with 170 gms. giving the best spreadability. The modified coating containing the finely divided insulating material ("Kaylo") was applied in the same manner as described in Example II, and the coated cup halves incorporated into the apparatus as before. Examination of glassware handled by these coated cup halves revealed the existence of "check marks." Also, after about one hour of continuous operation, examination of the cup halves revealed bare spots and general degradation of the coating. Continued operation was not feasible without replacement of the cup halves having fresh coating thereon.

EXAMPLE IV

The procedure of Example II was repeated, except that in place of the finely divided asbestos, there was substituted powdered talc which is also commonly referred to as soapstone. Talc has the general formula $$3MgO-4SiO_2-H_2O$$

and is thus chemically related to the asbestos material of Example II and the insulating material ("Kaylo") of Example III. The complete formulation is given in Table I.

Table I

| | Gms. |
|---|---|
| Buckeye glass chute coating (65% solids and 35% xylene solvent) [1] | 265 |
| Finely divided talc | 170 |

[1] The solids consist of 70% phenolic resin and 30% graphite.

The above ingredients were simply stirred together to form an intimately mixed slurry of the talc and graphite in the solution of phenolic resin. The mixture of slurry was of spreadable consistency which was conveniently applied to the surface of the cup halves by a common paint brush.

Two coats of the resulting intimate mixture were applied to a series of cup halves. The first coat was painted on by brush and then the coated elements were placed in an oven at 212° F. for one hour. The second coat, also painted on, was cured by baking in the same oven for one and one-half hours. The formulation of Table I provided sufficient material to apply two coats to 20 (10 pairs) cup halves, each having 15 square inches of inner surface. In other words, the formulation covered 300 square inches of area. The coated cup halves were installed in the apparatus, and the operation commenced. Careful examination of the glassware handled by the cup halves bearing the coating mixture of the invention revealed that no "check marks" were being imparted to the ware. Furthermore, the operation of the equipment was continued without stop for three successive days without observation of any glassware containing "check marks." After three days (72 hours), the run on the particular type of glassware was completed, and, consequently, the machinery was shut down in order that different molds for a different glass ware design could be substituted in the glass-forming machine. While the equipment was shut down, the coated cup halves were examined closely. It was observed that the coating was still continuous, and was not materially degraded.

Exactly why the addition of talc or soapstone to the xylene-graphite-phenolic resin mixture provides a coating which endures three days' (72 hours') continued service without imparting "check marks" and without material degradation is not known. The performance is considered particularly unexpected in view of the fact that related materials, e.g., asbestos and the insulating material identified as "Kaylo," failed to even closely approach the performance, achieved with the coating containing talc, under identical conditions.

The utilization of an additional solvent, e.g., butyl alcohol, was found desirable in order to achieve a harder coating.

Modifications may be resorted to and the invention is not intended to be limited to the precise embodiment disclosed except as necessitated by the scope of the appended claims.

We claim:

1. In apparatus for receiving and delivering hot, formed glass articles wherein said apparatus includes a guide member capable of contacting said hot glass articles, the improvement whereby said guide member may contact the surface of said hot glass article without imparting a "check" mark to the surface of said hot glass article comprising having that portion of the guide member which contacts said hot glass surface comprise a heat-bonded coating consisting essentially of a mixture of a thermosetting resin, graphite and finely divided talc, said talc being present in sufficient amount by weight of said mixture to prevent formation of "check" marks on said hot glass article in contact with said coating.

2. The apparatus as defined in claim 1 wherein the amount of said talc in said mixture is approximately 50% by weight of said mixture.

3. The apparatus as defined in claim 1 wherein the heat-bonded coating consists essentially of a phenolic resin, graphite and finely divided talc.

4. The apparatus as defined in claim 3 wherein the amount of said talc, by weight, is approximately 50% of the combined weight of said phenolic resin, graphite, and talc.

5. In apparatus for receiving hot, formed glass articles having a temperature of from about 900° F. to about 1600° F. and delivering said hot glass articles to a station, said apparatus including a guide member capable of contacting said hot glass article, the improvement whereby said guide member may contact the surface of said hot glass article without imparting a "check" mark to the surface of said glass article comprising that portion of the guide member which contacts the surface of the hot glass article having a heat-bonded coating thereon, said coating consisting essentially of a mixture of thermosetting resin, graphite and finely divided talc, said talc being present in sufficient amount of weight of said mixture to prevent formation of "check" marks on said hot glass article in contact with said coating.

6. The apparatus as defined in claim 5 wherein said heat-bonded coating consists essentially of a mixture of a phenolic resin, graphite and finely divided talc.

7. In apparatus for handling hot glass articles and having a surface for contacting the hot glass articles, the improvement whereby said surface contacts the hot glass article without imparting a "check" mark to said article comprising having said surface consist essentially of a heat-bonded coating of a mixture of thermosetting resin, graphite, and finely divided talc, said talc being present in sufficient amount by weight of said mixture to prevent formation of "check" marks on said hot glass article in contact with said coating.

8. The apparatus as defined in claim 7 wherein said heat-bonded coating consists essentially of a mixture of a phenolic resin, graphite and finely divided talc.

9. The apparatus as defined in claim 7 wherein the amount of said talc in said mixture is approximately 50% by weight of said mixture.

10. In the method of handling a hot glass article having a temperature of from about 900 to 1600° F. including the step of contacting said article with a guide surface, the improvement whereby said guide surface contacts said hot glass article without imparting a "check" mark thereto comprising contacting said article with a guide surface consisting essentially of a heat-bonded mixture of a thermosetting resin, graphite and finely divided talc, said talc being present in sufficient amount by weight of said mixture to prevent formation of "check" marks on said hot glass article in contact with said guide surface.

11. The method of handling a hot glass article as defined in claim 10 wherein said guide surface consists essentially of a heat-bonded mixture of a phenolic resin, graphite and finely divided talc.

12. The method of handling a hot glass article as defined in claim 10, wherein the amount of said talc in said mixture is approximately 50% by weight of said mixture.

References Cited in the file of this patent
UNITED STATES PATENTS

| | | |
|---|---|---|
| 941,605 | Bakeland | Nov. 30, 1909 |
| 1,873,945 | Kraenzlein | Aug. 23, 1932 |
| 2,247,118 | Drake | June 24, 1941 |
| 2,332,196 | Bjorksten | Oct. 19, 1943 |
| 2,408,526 | Minton | Oct. 1, 1946 |
| 2,581,301 | Saywell | Jan. 1, 1952 |
| 2,700,623 | Hall | Jan. 25, 1955 |
| 2,758,421 | Smith | Aug. 14, 1956 |
| 2,802,805 | Dietz | Aug. 13, 1957 |
| 2,873,555 | Conrad | Feb. 17, 1959 |